June 13, 1967  J. W. SACKETT  3,325,010
FILTER CLOGGING INDICATOR
Filed Oct. 9, 1963  2 Sheets-Sheet 1

INVENTOR.
JAMES W. SACKETT
BY
Bosworth, Sessions
Herrstrom & Knowles
ATTORNEYS

United States Patent Office 3,325,010
Patented June 13, 1967

3,325,010
FILTER CLOGGING INDICATOR
James W. Sackett, Mentor, Ohio, assignor to Cleveland Technical Center, Inc., Cleveland, Ohio, a corporation of Delaware
Filed Oct. 9, 1963, Ser. No. 314,899
9 Claims. (Cl. 210—90)

This invention relates to filter condition indicators, and more particularly to apparatus for indicating when a filter is harmfully clogged.

While the invention may be used to advantage to indicate clogging of various types of filters, including automotive engine oil filters, it provides exceptional advantages when used in association with lubricating oil filters for diesel railroad locomotives, and therefore will be discussed in connection with such use.

Lubricating oil filters are usually used with such engines to remove from their lubricating oil contaminants that could harm the engines, which are expensive and must provide dependable service. In order to achieve maximum engine protection, the filter elements must be replaced when they become clogged sufficiently to prevent the filter from performing an adequate filtering function. The replacement of the filters at the appropriate time, however, is no simple matter.

Locomotive engines are commonly inspected at periodic, usually monthly, intervals. In the absence of any means for indicating the condition of the filter without disassembling it, the usual practice is to change the filter elements during such periodic inspections whether or not they are sufficiently clogged to require changing. Often they are not harmfully clogged because the locomotive had not been extensively used during the preceding month or for other reasons. The replacement of filter elements then involves unnecessary material and labor expense, particularly when the filter element is a relatively expensive disposable element that is disposed of before it has become harmfully clogged.

Attempts to avoid such unnecessary expense by the use of filter clogging indicators heretofore have not been as successful as desired. Most, if not all prior indicators have indicated that the filter is clogged only during the time the engine is running and not after it is halted; and they have often given erroneous indications when the oil is cold. Such prior indicators, therefore, have required that an employee read the indicator while the engine is running and is hot, which often is not convenient or is overlooked. Prior indicators, moreover, have usually been complicated, not as dependable as desired, and expensive.

An object of this invention is a provision of apparatus for indicating the condition of a filter for filtering fluids that is free of the above disadvantages. Another object is the provision of a filter condition indicator that will continue to indicate if a filter is clogged after the operation of the filter has been halted. Another object is the provision of the filter condition indicator that will determine whether the filter element has reached a predetermined degree of clogging while the fluid is being supplied to the filter, and will maintain an indication that the filter has exceeded such predetermined condition of clogging until the indicator has been reset, whether or not fluid is continuously supplied to the filter. A further object is the provision of a filter indicator that will not give an inaccurate reading when the fluid being filtered is at higher than operating viscosity. Another object is to provide a filter condition indicator that is simple in construction and operation, inexpensive and dependable.

These and other objects and advantages of the invention will become apparent from the following description of several embodiments, in connection with the accompanying drawings, in which.

Figures 1, 2, 3:
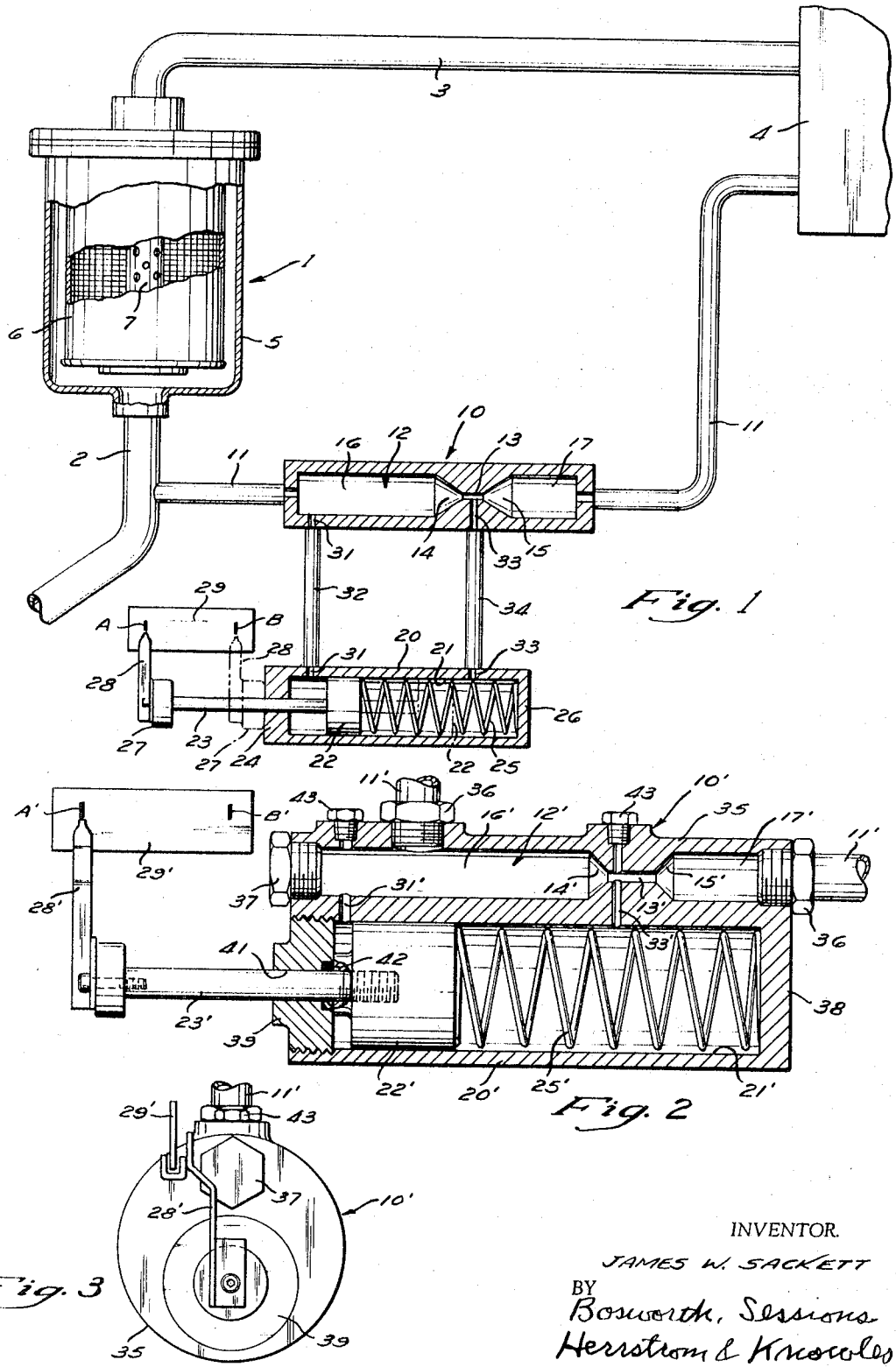
FIGURE 1 is a diagrammatic representation of a system including a filter and an indicator embodying the invention.
FIGURE 2 is a vertical sectional elevation of a cylinder and piston device embodying an indicating pointer that may be utilized in a system like that of FIGURE 1.
FIGURE 3 is an end elevation from the left of FIGURE 2.

In the arrangement of FIGURE 1, a filter 1 is supplied through inlet pipe 2 with fluid to be filtered, which is lubricating oil in this case. The filtered oil leaves the filter through an outlet, shown as pipe 3, that discharges into the place for which the oil is intended, such as crankcase 4 of an internal combustion engine such as a diesel engine.

Filter 1 is diagrammatically shown as comprising a housing 5 into which the inlet pipe 2 discharges, which housing encloses a replaceable and disposable filter element 6 through which the oil being filtered passes into a central passage 7 that communicates with the outlet pipe 3. Filter 1 thus has an inlet side which is supplied with oil and an outlet side to which the oil passes through the filter element 6. Other types of filters may be used, including those with multiple filter elements.

The system of FIGURE 1 also includes means, represented generally by 10, for detecting when the filter has clogged to a predetermined degree and for indicating whether or not the filter has become thus clogged. This comprises a bypass conduit 11, communicating with the inlet to the filter unit 1, and discharging to a suitable location, such as crankcase 4. This conduit 11 includes a venturi section 12, having a throat 13 between converging inlet and outlet portions 14 and 15 that are properly shaped to avoid turbulence and assure a streamline flow of the fluid to, through and from the throat 13 at the rates of flow to be encountered. In the venturi section of FIGURE 1, inlet portion 14 opens into a chamber 16 communicating with the inlet portion of bypass conduit 11, while outlet portion 15 opens into chamber 17 communicating with the outlet portion of the bypass conduit 11. This is desirable since it permits the use of a throat substantially narrower than the portions on either side of it, while permitting use of bypass conduit the major length of which is smaller in diameter than would otherwise be the case.

In the apparatus of FIGURE 1, a closed cylinder 20, having a bore 21, is located adjacent the venturi section 12. A piston 22 slidably closely fits in bore 21; one side of the piston has a piston rod 23, that is slidably mounted in sealing engagement in the closed rod end 24 of cylinder 20. A compression spring 25 between the other side of the piston 22 and the blind end 26 of the cylinder biases the piston toward the rod end of the cylinder. The projecting free end of the piston rod 23 carries a permanently magnetized member 27 that causes the piston rod and the piston connected to it to be held in an innermost position, shown by broken lines, after the piston has moved inwardly of the cylinder magnet until magnet 27 is close to the cylinder end 24 that is formed of material, as steel, that will attract the magnet. The free end of piston rod 23 rigidly carries a pointer 28 movable adjacent a panel 29 carrying marks A and B that indicate the extreme outward and inward positions of the piston rod.

A passage 31, extending through a conduit 32, connects the cylinder bore 21 near its rod end with bypass conduit 11 upstream from venturi throat 13, being preferably connected to the interior of chamber 16; the pressure of liquid in passage 31 is closely related to and directly influenced by the pressure of liquid on the inlet side of the filter. A passage 33, extending through conduit 34, connects the throat 13 of the venturi section to cylinder bore 21 at a location spaced along the bore from passage 31 so it is preferably unobstructed by the piston when it is in its extreme inward position; the pressure of liquid in passage 33 is closely related to and directly influenced by the pressure exerted by the liquid passing through throat 13.

The operation of the apparatus shown in FIGURE 1 is as follows, assuming initially that the filter is unclogged, the piston 22 is located as shown in full lines in FIGURE 1 with its pointer 28 adjacent marker A, and that lubricating oil at operating temperature is passing through inlet pipe 2 through filter 1 and out through outlet pipe 3. The oil passing through inlet pipe 2 then is at normal pressure that is predetermined by the oil pump and by the design of the apparatus. A minor portion of the oil from inlet pipe 2 will bypass through conduit 11, traveling through the venturi section 12 and into crankcase 4. The oil passing through the venturi throat 13, of course, is accelerated to a higher velocity than elsewhere in the venturi section, the throat speed being determined by the viscosity and pressure of the oil and the dimensions and proportions of the parts. According to Bernoulli's theorem, under such conditions the pressure in passage 33 is less than the pressure in passage 31, depending on the relative velocities of the oil in the locations where passages 31 and 33 open into the venturi section. The spring 25, however, is designed to exert sufficient force to overcome the force resulting from the difference in the pressures on opposite sides of the piston 22 while the filter is unclogged, so that the piston is urged to the position shown in full lines in FIGURE 1 in which its piston rod is fully extended.

If, however, the filter becomes clogged the pressure in inlet pipe 2 increases, with a corresponding increase in the pressure of oil in bypass conduit 11. This causes the velocity of flow of oil through the throat 13 to increase proportionally more than the velocity of the flow of oil past passage 31 in the venturi section. When the filter element 6 has become harmfully clogged, there is a predetermined increase in the pressure in pipe 2 and bypass conduit 11 that increases the velocity of oil flow through venturi throat 13 so that the difference in the velocities of the oil at the locations where passages 31 and 33 open into the venturi section is substantially increased. Preferably, the venturi section is designed so that under these circumstances the pressure in passage 31 communicating with the rod side of the piston is increased substantially above atmospheric pressure while the pressure in passage 33 communicating with the other side of the piston is decreased appreciably below atmospheric pressure. In any event, the apparatus is so designed that the difference between the pressure of the liquid in these passages and on opposite sides of the piston develops a net force on the piston that overcomes the biasing force of the spring 25 and causes piston 22 to move inwardly at cylinder bore 21 until its magnet 27 is captured and held by the end 24 of the cylinder. The pointer 28 then indicates visually at B that the filter has become clogged at least to the predetermined degree; the visual indication is maintained because the piston rod is held by the magnet until the position of its pointer 28 is noticed. After corrective action is taken, the piston rod may then be manually moved until its pointer 28 is in position A.

If the lubricating oil is cold and thus of a higher viscosity, only a small amount if any of the viscous liquid flows through the venturi section, so that the difference in velocities at the locations where passages 31 and 33 communicate with the venturi section is so small that the resulting pressure differential is insufficient to cause the piston 22 to move, whether or not the filter is clogged. Thus, the apparatus illustrated in FIGURE 1 will not give an erroneous reading when the liquid to be filtered is at lower than operating temperature and of higher than operating viscosity; the piston will move only when the liquid is at operating temperature and the filter is clogged.

FIGURES 2 and 3 show a more compact version of the detecting and indicating means 10 of FIGURE 1. For convenience, in FIGURES 2 and 3, parts corresponding to similar parts of FIGURE 1 will bear the same reference characters with a prime subscript. The device of FIGURES 2 and 3 comprises a metal body 35 which incorporates both the venturi section 12' and cylinder 20' of FIGURE 1. Body 35 is bored to provide cylinder bore 21' and a venturi section 12' comprising a throat 13' and diverging inlet and outlet portions 14' and 15' respectively communicating with chambers 16' and 17' of a diameter considerably larger than that of throat 13'. Chamber 16' communicates with the portion of bypass conduit 11' connected to inlet pipe 2, while chamber 17' communicates with the portion of conduit 11' forming the outlet from the venturi section. These portions of the conduit 11' are shown as connected to the venturi section by threaded fittings 36. For ease in manufacture, the venturi section 12' is bored through body 35 along an axis parallel to that of the cylinder bore 21', one end being closed by plug 37. The parts of the venturi section preferably are so shaped as to provide streamline flow of the liquid under the conditions of use.

The cylinder bore 21' is formed in body 35 with one closed integral end 38, the other end being closed by a threaded closure member 39 that corresponds to the end wall 24 of FIGURE 1, and has a bore 41 in which the piston rod 23' is slidably mounted. A seal 42 in member 39 seals the piston rod against escape of liquid.

Piston rod 23' is threaded into a piston 22' that is closely slidably mounted in bore 21'. A biasing spring 25' is mounted between the end of the piston opposite its rod end and closed end 38 of the cylinder bore. Body 35 includes a passage 31' between chamber 16' and the space between the rod end of the piston and the end wall 39 of the cylinder, and a passage 33' between the throat 13' of the venturi section and the bore 21' at a location preferably not covered by the piston 22' in its innermost travel. For convenience in manufacture and cleaning, the passages 31' and 33' are machined laterally into the body 35 from its exterior, at which they are closed by threaded plugs 43.

Piston rod 23' carries a pointer 28' that moves adjacent to indicating panel 29' carrying marks A' and B', as in FIGURE 1. Device 10' of FIGURES 2 and 3 operates in the manner described above for device 10 of FIGURE 1, so no further discussion is required.

Figure 4:
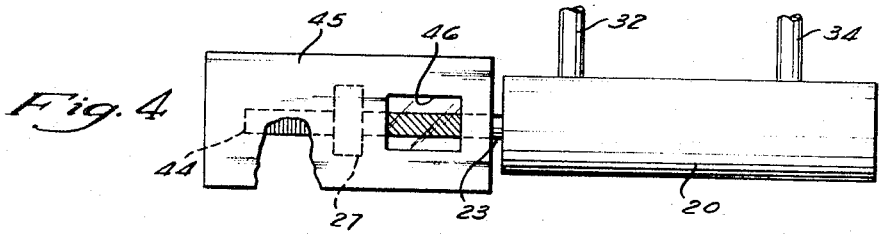
FIGURE 4 is a diagrammatic representation of another form of cylinder-type indicating means that may be employed in the arrangement of FIGURE 1, this embodying color coding on the piston rod.

FIGURE 4 illustrates an embodiment in which the cylinder 20 of FIGURE 1 is modified so its piston rod 23 has a portion 44 that projects axially beyond the magnet 27. A shield 45, having an opening 46, covered with transparent material if desired, is located adjacent piston rod 23. The opening and associated parts are designed so that when the rod 23 is extended, its portion between the magnet 27 and the cylinder is visible, whereas when the rod is retracted, the projection portion 44 is visible through opening 46. This portion 44 may have a suitable warning color, such as red, so that when visible it indicates that the filter has been harmfully clogged, the magnet 27 holding the rod in this position until corrective action is taken and the device reset. If desired, the portion of rod 23 on the other side of magnet 27 may have a contrasting color, such as green, to indicate when visible that the filter is not clogged.

Figure 5:
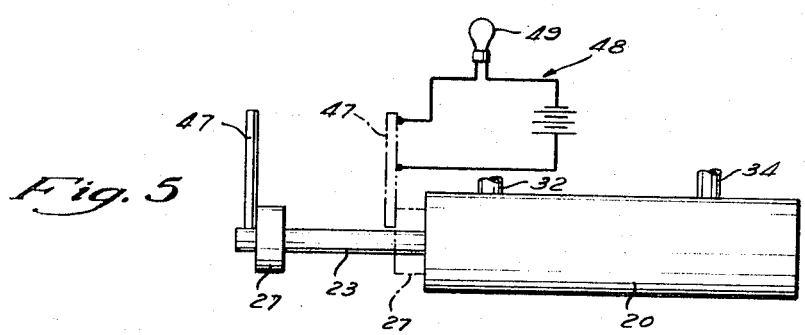
FIGURE 5 is a diagrammatic representation of another cylinder-type indicating means, shown as used with an electrical circuit to indicate by lighting of an electric bulb when the filter is clogged.

FIGURE 5 illustrates an embodiment according to which a visual warning signal is provided by electrical means when the piston rod 23 of cylinder 20 moves to its innermost position due to clogging of the cylinder, as described above in connection with FIGURE 1. In FIGURE 5 the free end of piston rod 23 that carries magnet 27 also carries a laterally projecting contact member 47 that closes a powered electric circuit 48 including a visual signal such as a bulb 49.

Figure 6:
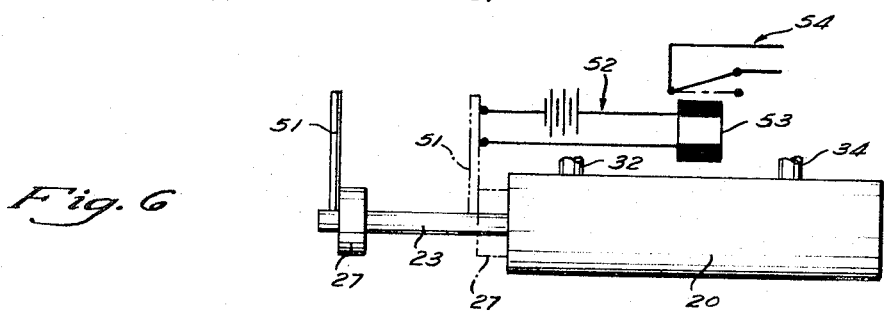
FIGURE 6 is a diagrammatic representation of still another form of cylinder-type indicating means associated with electrical circuit means embodying a relay-type circuit breaker which may be used in conjunction with another electrical circuit means, as that circuit controls operation of an internal combustion engine.

FIGURE 6 illustrates an embodiment in which retraction of the piston rod 23 of cylinder 20, in response to clogging of its filter, as described above in connection with FIGURE 1, causes laterally projecting contact member 51 on the end of the piston rod 23 to close a powered circuit 52 to actuate a relay 53 that opens another circuit 54. Circuit 54 may form part of the ignition circuit of an ignition type internal combustion engine, or of a control system for a diesel engine, so that when the filter becomes harmfully clogged the engine may be halted or idled.

Figure 7:
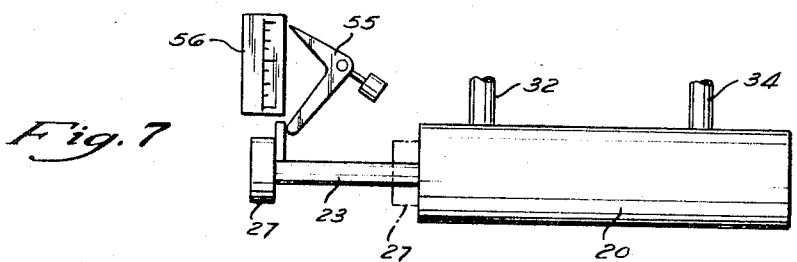
FIGURE 7 is a diagrammatic showing of another cylinder-type indicating means that actuates a mechanical pointer.

FIGURE 7 illustrates another embodiment in which the retraction of piston rod 23 of cylinder 20 due to clogging of the filter mechanically actuates a pivoted pointer 55 that indicates on a scale 56 that the filter is clogged.

It is apparent that in any of the preceding embodiments the means 10 can be modified so that the piston rod moves outwardly from the cylinder, rather than inwardly, when the filter is harmfully clogged.

Figure 8:
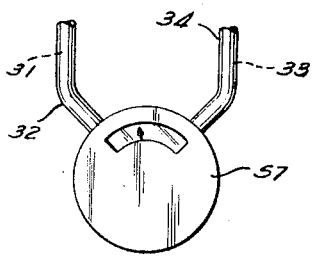
FIGURE 8 is a diagrammatic representation of a differential pressure gauge that may be used in the indicator.

FIGURE 8 illustrates an embodiment in which, in the arrangement of FIGURE 1, the cylinder 20 that senses when the pressure differential in passages 31 and 33 exceeds a predetermined amount due to filter clogging may be replaced by a suitable dial type gauge 57 connected to passages 31 and 33, that is capable of sensing pressure differentials and recording the information. A suitable gauge for this purpose is Model 227 of Barton Instrument Corp.

It is apparent that the present invention provides a filter-clogging indicator that is free of the disadvantages previously discussed, that will effectively indicate whether a filter has been clogged beyond a predetermined amount, and that can maintain such indication even after the operation of the filter has been discontinued or the engine in connection with which the filter has been used has been stopped. It is also apparent that the filter will not give an erroneous reading when the filter fluid has not reached operating temperature. The indicator of the invention, moreover, may be made to be very simple in construction and operation, inexpensive and dependable.

The above and other modifications of the invention will be apparent to those skilled in the art. It is intended that the patent shall cover by suitable expression in the appended claims whatever features of patentable novelty reside in the invention.

I claim:

1. Apparatus for indicating when a fluid filter is clogged, said filter having an inlet side and an outlet side and means for supplying fluid to the inlet side of said filter under pressure that causes the fluid to flow through said filter when it is unclogged and that increases when the filter is clogged, comprising a conduit branching from the inlet side of said filter so that a portion of the fluid can pass through said conduit, the conduit being constructed and arranged so that the portion of the fluid flowing through said conduit increases as the filter becomes clogged, said conduit having a first portion of relatively large cross section and a second portion of smaller cross section downstream of said first portion, a first passage means having one end connected to said first portion, a second passage means having one end connected to said second portion, and indicating means, the other ends of said first and second passage means being connected to said indicating means so that the latter indicates the clogged condition of said filter.

2. Apparatus according to claim 1 wherein said conduit includes a venturi section constituting said second portion.

3. Apparatus of claim 1 in which said indicating means comprises a cylinder, a piston slidably mounted in said cylinder, said passages being connected to said cylinder on opposite sides of said piston, and resilient means urging said piston for movement in one direction, said piston being capable of being moved in the opposite direction by the difference in the fluid pressures in said passages, whereby said piston is urged in one direction by said resilient means when said filter is unclogged and is urged by a difference in fluid pressures in said passages and on opposite sides of said piston to move in the other direction when said filter is clogged to a predetermined degree.

4. The apparatus of claim 3 comprising means associated with and moved by said piston for indicating that the filter is clogged, and means for holding said indicating means in the position to which it is moved when the filter is clogged.

5. The apparatus of claim 3 having means associated with said piston for indicating that the filter is clogged when the piston is moved against the force exerted by said biasing means.

6. The apparatus of claim 5 in which said means comprises an electrically actuated signal.

7. The apparatus of claim 5 in which said means operates to control an electrical circuit.

8. The apparatus of claim 5 in which said means comprises color coding associated with said piston.

9. The apparatus of claim 5 in which said means comprises a pointer actuated by said piston to indicate when the filter is clogged.

References Cited

UNITED STATES PATENTS

| | | | |
|---|---|---|---|
| 1,340,198 | 5/1920 | Wilkonson | 116—70 |
| 1,652,941 | 12/1927 | Isaac | 73—213 |
| 2,776,056 | 1/1957 | Douglas | 210—90 |
| 2,912,110 | 11/1959 | Stoltenberg | 210—90 |
| 3,011,470 | 12/1961 | Stoermer | 210—90 X |
| 3,056,379 | 10/1962 | Thomas | 210—90 X |
| 3,154,049 | 10/1964 | Smith et al. | 210—90 X |

SAMIH N. ZAHARNA, *Primary Examiner.*